Sept. 8, 1964   R. P. NIRENBERG   3,148,236
CREASING PROCESS FOR THERMOPLASTIC MATERIALS
Filed Oct. 30, 1961
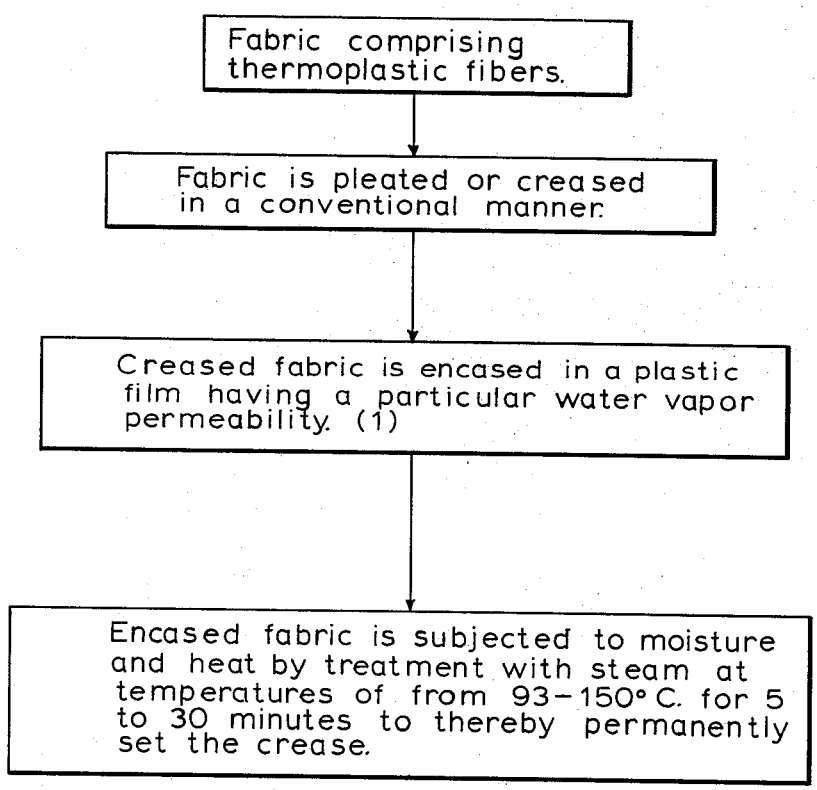
(1) The water vapor permeability of the plastic film is 0.01 to 1.5 gms./24 hrs./$M^2$/mm. thickness/cm. Hg at 25° C.
INVENTOR.
Robert P. Nirenberg
BY
ATTORNEY

United States Patent Office 3,148,236
Patented Sept. 8, 1964

3,148,236
CREASING PROCESS FOR THERMO-
PLASTIC MATERIALS
Robert P. Nirenberg, New York, N.Y., assignor, by mesne assignments, to Monsanto Company, a corporation of Delaware
Filed Oct. 30, 1961, Ser. No. 148,700
16 Claims. (Cl. 264—324)

This invention relates to a process for pleating or creasing fabrics composed of thermoplastic fibers. More particularly, this process is concerned with pleating or creasing fabrics composed of thermoplastic fibers, or blends of thermoplastic fibers and natural fibers, in which there is no damage or distortion to the pleated or creased fabric due to an excess of moisture.

It is well known in the prior art to machine pleat or crease the fabrics with a paper pattern or covering being used on both sides of the fabrics; then subjecting the pleated fabrics, pleated either by machine or by hand, to heat and pressure, thus setting or curing the creases in a permanent manner. The heat applied is generally a steaming operation which has resulted in the past in an accumulation of excess moisture on the creased fabrics. In some prior art methods, the creased fabrics with their paper coverings are rolled onto a cardboard roll and then subjecting to steam heat and pressure. These thermoplastic fibers, which go to make up the fabrics, soften quite easily upon the application of moisture and heat and thus readily assume the shape given them under this heat and pressure treatment. However, this fabric pleated or creased by the methods of the prior art, had the disadvantage of acquiring excessive glaze or shine, puckers, cockles, ripples, bubbles, etc., which rendered same unacceptable commercially. It is believed that one of the main reasons for these imperfections is due to the accumulation and/or condensation of excess moisture on the pleated fabrics. This results in non-uniform tension on the yarns or fabric thus permitting a stress-strain differential in slack and taut areas of the fabrics.

An object of this invention is to prevent excess moisture from being deposited upon pleated fabrics while being cured or set.

Another object of this invention is to impart a more permanent pleat to thermoplastic fabrics.

Another object of this invention is to prevent puckers, bubbles, cockles and ripples from arising in pleated thermoplastic fabrics.

Another object of this invention is to provide a moisture barrier for the pleated thermoplastic fabric during the curing or setting step.

Another object of this invention is to produce sharp, clear pleats.

Other objects of this invention will hereinafter become apparent.

In general the process of this invention is carried out by wrapping and sealing the creased or pleated thermoplastic fabric inside of a pliable sheet or case of plastic film and then placing the rolled and encased fabric in an autoclave or steam box where the curing or permanent setting of the creases or pleats is accomplished. The encased roll is removed from the autoclave or steam cabinet and allowed to cool, at which time the excess condensed moisture is wiped off the plastic covering and the creased or pleated thermoplastic fabric is then removed from its covering.

More specifically, the fabrics which are pleated or creased by conventional methods, such as using hand pleating formers or a pleating machine, are encased in a sheet of plastic film of polyethylene or its equivalent in water absorption, water vapor permeability and gas permeability, for example polyamides, polypropylene, polyesters, polystyrene, vinyl nitrile rubber, silicon rubber, etc. Any of the pliable plastics which have a water permeability of at least 0.01 gram/24 hours/M$^2$/mm. thickness/cm. Hg at 25° C. and not above 1.5 grams/24 hours/M$^2$/mm. thickness/cm. Hg at 25° C., a water absorption which may be 0 percent, and no greater than 1.5 percent as determined by A.S.T.M. D. 570 per 24 hours and a gas permeability as determined by oxygen of at least 0.01×10$^{-6}$ grams/24 hours/M$^2$/mm. thickness/cm. Hg at 21° C., 0 percent R.H. and no higher than 1,900×10$^{-6}$ grams/24 hours/M$^2$/mm. thickness/cm. Hg at 21° C., 0 percent R.H. may be used in the process of this invention. The preferred water vapor permeability is 0.1 gram as defined above; the preferred water absorption is less than 0.5 percent as defined above and the preferred gas permeability as determined by oxygen is less than 0.5×10$^{-6}$ grams as defined above. These limitations were determined by tests as disclosed in Modern Plastic Encyclopedia, 1961 edition.

These encased fabrics are then placed in a steam cabinet or autoclave and heated to a temperature range of 93° C. to 150° C. with the preferred temperature being 95° C. for a period of 5 minutes to 30 minutes with the preferred being 20 minutes. Prior to inserting the encased roll in the steam cabinet, the steam chamber inlets, all vents, pipes, valves etc. being covered, wrapped or capped with a highly-moisture absorbent material such as cotton batting, toweling or similar material. This prevents the entrance of an excessive amount of steam into the environment of the curing or setting operation. It is possible, due to the wrapping of the thermoplastic in the plastic sheeting that some areas which may not have been completely covered by the sheeting, that excess moisture will settle on thest unprotected areas. In addition, this will insure a more uniform temperature control. The encased rolls are then withdrawn from the heated area and allowed to cool to room temperature, at which time the plastic covering is wiped free of excess moisture and then the covering is removed from the creased or pleated fabric. The drawing is a flow sheet which depicts the sequence of steps, the conditions and the materials employed.

The fabrics which may successfully use the process of this invention are composed of synthetic linear acrylonitriles and blends of same with natural occurring fibers such as wool, cotton and silk, as well as blends of synthetic linear acrylonitriles with artificial fibers such as acetate rayon, viscose rayon, etc. The percentages of acrylic fibers to natural or artificial fibers are from 10 percent of acrylics to 90 percent of natural or artificial, to 100 percent of acrylic to 0 percent of natural or artificial with the preferred ratio being 60 percent acrylic to 40 percent natural or artificial fibers. The synthetic linear acrylonitriles which may be employed in the practice of this invention are polyacrylonitrile, copolymers, including binary and ternary polymers containing at least 80 percent by weight of acrylonitrile in the polymer molecule, or a blend comprising polyacrylonitrile or copolymers comprising acrylonitrile with from 2 to 50 percent of another polymeric material, the blend having an overall polymerized acrylonitrile content of at least 80 percent by weight. While the preferred polymers employed in the instant invention are those containing at least 80 percent of acrylonitrile, generally recognized as the fiber-forming acrylonitrile polymers, it will be understood that the invention is likewise applicable to polymers containing less than 80 percent acrylonitrile. The acrylonitrile polymers containing less than 80 percent acrylonitrile are useful in forming films, coating compositions, molding operations, lacquers, etc.

For example, the polymer may be a copolymer of from 80 to 98 percent acrylonitrile and from 2 to 20 percent of another monomer containing the >C=C< linkage and copolymerizable with acrylonitrile. Suitable mono-olefinic monomers include acrylic, alpha-chloroacrylic and methacrylic acids; the acrylates, such as methylmethacrylate, ethylmethacrylate, butylmethacrylate, methoxymethyl methacrylate, beta-chloroethyl methacrylate, and the corresponding esters of acrylic and alpha-chloroacrylic acids; vinyl chloride, vinyl fluoride, vinyl bromide, vinylidene chloride, 1-chloro-1-bromo-ethylene; methacrylonitrile; acrylamide and methacrylamide; alpha-chloroacrylamide; or monoalkyl substitution products thereof; methylvinyl ketone; vinyl carboxylates, such as vinyl acetate, vinyl chloroacetate, vinyl propionate and vinyl stearate; N-vinylimides such as N-vinylphthalimide and N-vinylsuccinimide; methylene malonic esters; itaconic acid and itaconic esters; N-vinylcarbazole; vinyl furane; alkyl vinyl esters; vinyl sufonic acid; ethylene alpha, beta-dicarboxylic acids or their anhydrides or derivatives, such as diethylcitraconate, diethylmesaconate, styrene, vinyl naphthalene; vinyl-substituted tertiary heterocyclic amines, such as the vinylpyridines and alkyl-substituted vinylpyridines, for example, 2-vinylpyridine, 4-vinylpyridine, 2-methyl-5-vinylpyridine, etc.; 1-vinylimidazole and alkyl-substituted 1-vinylimidazoles, such as 2-, 4- or 5-methyl-1-vinylimidazole, and other >C=C< containing polymerizable materials.

The polymer may be a ternary or higher interpolymer, for example, products obtained by the interpolymerization of acrylonitrile and two or more of any of the monomers, other than acrylonitrile, enumerated above. More specifically, and preferably, the ternary polymer comprises acrylonitrile, methacrylonitrile, and 2-vinylpyridine. The ternary polymers preferably contain from 80 to 98 percent of acrylonitrile, from 1 to 10 percent of a vinylpyridine or a 1-vinylimidazole, and from 1 to 18 percent of another substance such as methacrylonitrile or vinyl chloride.

The polymer may also be a blend of a polyacrylonitrile or of a binary interpolymer of from 80 to 99 percent acrylonitrile and from 1 to 20 percent of at least one other >C=C< containing substance with from 2 to 50 percent of the weight of the blend of a copolymer of from 10 to 70 percent of acrylonitrile and from 30 to 90 percent of at least one other >C=C< containing polymerizable monomer. Preferably, when the polymeric material comprises a blend, it will be a blend of a copolymer of 90 to 98 percent acrylonitrile and from 2 to 10 percent of another mono-olefinic monomer, such as vinyl acetate, which is not receptive to dyestuff, with a sufficient amount of a copolymer of from 10 to 70 percent of acrylonitrile and from 30 to 90 percent of a vinyl-substituted tertiary heterocyclic amine, such as vinylpyridine or 1-vinylimidazole, to give a dyeable blend having an overall vinyl-substituted tertiary heterocyclic amine content of from 2 to 10 percent, based on the weight of the blend.

In addition to the acrylics, the modacrylics which are fibers composed of at least 35 percent acrylonitrile but less than 85 percent acrylonitrile with the balance of the percentage up to 100 percent being the monomers as defined hereinbefore. The fabrics, which may be used in the process of this invention, as defined above, may be woven, non-woven or knitted.

The following examples are illustrative rather than limitative and all parts, proportions and percentages are by weight unless otherwise indicated.

*Example 1*

A fabric composed of 70 percent of a fiber of 94 percent acrylonitrile and 6 percent vinyl acetate and 30 percent viscose rayon was pleated in a known manner. Then the pleated fabric was placed around a cardboard roller and encased in a sheet of polyester having a water vapor permeability of 0.1 gram as defined hereinbefore. The encased roll was then placed in an autoclave at 18 p.s.i.g., 265° F. for 5 minutes. The encased roll was then removed from the autoclave and cooled to room temperature. The outside of the encased roll was wiped to remove any moisture present if any, and then the pleated fabric was removed from the encasement. The pleats were sharp and clear and there was an acceptable minimum of puckers, cockles, ripples and bubbles.

*Example 2*

A fabric composed of 70 percent of a fiber of a blend of 88 percent of one copolymer composed of 94 percent acrylonitrile and 6 percent vinyl acetate and 12 percent of another copolymer composed of 50 percent acrylonitrile and 50 percent methyl vinyl pyridine and 30 percent viscose rayon was pleated in a known manner. Then the pleated fabric was placed around a cardboard roller and encased in a sheet of polyester having a water vapor permeability of 0.1 gram as defined hereinbefore. The encased roll was then placed in an autoclave at 18 p.s.i.g., 265° F. for 5 minutes. The encased roll was then removed from the autoclave and cooled to room temperature. The outside of the encased roll was wiped to remove any moisture present if any, and then the pleated fabric was removed from the encasement. The pleats were sharp and clear and there was an acceptable minimum of puckers, cockles, ripples and bubbles.

*Example 3*

A fabric composed of tri-acetate fibers was pleated in a known manner. The pleated fabric was then encased in a sheet of polyamide having a water vapor permeability of 0.3–1.8 grams as defined hereinbefore. The encased roll was then placed in a steam cabinet under 0 p.s.i.g. at a temperature of 100° C. for 15 minutes. The encased roll was then removed from the autoclave and cooled to room temperature. The outside of the encased roll was wiped to remove any moisture present and the pleated fabric was then removed from the encasing plastic film. The pleats were sharp and clear and no ripples, puckers, cockles and bubbles were present.

*Example 4*

A fabric composed of fibers of 50 percent of a 94 percent acrylonitrile and 6 percent vinyl acetate and 50 percent wool was pleated in a conventional manner. Then the pleated fabric was placed around a cardboard roller and encased in a sheet of polyester having a water vapor permeability of 0.1 gram as defined hereinbefore. The encased roll was then placed in an autoclave under 18 p.s.i.g. at 95° C. for a period of 20 minutes. The encased roll was then removed from the autoclave and cooled to room temperature. The outside of the encased roll was wiped to remove any moisture present if any, and then the pleated fabric was removed from the encasement. The pleats were sharp and clear and there was an acceptable minimum of puckers, cockles, ripples and bubbles.

*Example 5*

The same process of Example 4 was repeated except the fiber was one composed of 50 percent of a blend of 88 percent of one copolymer of 94 percent acrylonitrile and 6 percent vinyl acetate and 12 percent of another copolymer of 50 percent acrylonitrile and 50 percent methyl vinyl pyridine. The results were the same as in Example 4.

I claim:

1. A method of permanently pleating or creasing thermoplastic materials comprising creasing the material in a conventional manner and then encasing the creased material in a covering of plastic film selected from the group consisting of polyethylene, polypropylene, polyesters, polystyrene, vinyl nitrile rubber, silicone rubber and polyamides, said plastic film having a water vapor permeability of from about 0.01 to about 1.5 grams/24 hours/M²/mm. thickness/cm. Hg at 25° C. and subjecting same to steam at a temperature of from about 93° C. to about 150° C. for a period of time from about 5 to about 30 minutes.

2. The method of claim 1 in which the temperature is about 95° C. and the period of time is about 20 minutes.

3. A method for permanently pleating or creasing fabric composed of fibers of a polymer of acrylonitrile comprising creasing the fabric in a conventional manner, encasing said fabric in a plastic film, said plastic film having a water vapor permeability of from about 0.01 to about 1.5 grams/24 hours/M²/mm. thickness/cm. Hg at 25° C., and subjecting said encased fabric to steam at a temperature of from about 93° C. to about 150° C. for a period of time from about 5 to about 30 minutes.

4. A method of permanently pleating or creasing fabrics composed of fibers of a polymer of at least 80 percent acrylonitrile and up to 20 percent of a copolymerizable mono-olefinic monomer, comprising creasing the fabric in a conventional manner, encasing said creased fabric in a plastic film, said plastic film having a water vapor permeability of from about 0.01 to about 1.5 grams/24 hours/M²/mm. thickness/cm. Hg at 25° C., and subjecting said encased fabric to steam at a temperature of from about 93° C. to about 150° C. for a period of time from about 5 to about 30 minutes to permanently set the creases.

5. The method of claim 4 in which the fabric is composed of a fiber of a polymer of 94 percent acrylonitrile and 6 percent vinyl acetate.

6. The method of claim 4 in which the fabric is composed of fibers consisting of a blend of 88 percent of one copolymer of 94 percent acrylonitrile and 6 percent vinyl acetate, and 12 percent of another copolymer of 50 percent acrylonitrile and 50 percent methyl vinyl pyridine.

7. A method of permanently pleating or creasing fabrics composed of fibers of from 10 percent to 90 percent of a polymer of acrylonitrile and from 90 percent to 10 percent of a naturally occurring fiber selected from the group consisting of wool, silk and cotton, comprising creasing the fabric in a conventional manner, encasing the creased fabric in a plastic film, said film having a water vapor permeability of from about 0.01 to about 1.5 grams/24 hours/M²/mm. thickness/cm. Hg at 25° C. and subjecting same to a steam at a temperature from about 93° C. to about 150° C. for a period of time from about 5 to about 30 minutes.

8. A method of permanently pleating or creasing fabrics composed of a blend of fibers of 50 percent of a polymer of acrylonitrile and 50 percent of viscose rayon, comprising creasing the fabric in a conventional manner, encasing said creased fabric in a plastic film, said film having a water vapor permeability of from about 0.01 to about 1.5 grams/24 hours M²/mm. thickness/cm. Hg at 25° C., subjecting same to steam at a temperature of from about 93° C. to about 150° C. for a period of time of about 5 minutes to about 30 minutes to permanently set the crease.

9. A method of permanently pleating or creasing fabrics composed of fibers of triacetate, comprising creasing the fabric in a conventional manner, encasing said creased fabric in a plastic film, said film having a water vapor permeability of from about 0.01 to about 1.5 grams/24 hours/M²/mm. thickness/cm. Hg at 25° C., subjecting same to steam at a temperature of from about 93° C. to about 150° C. for a period of time ranging from about 5 to about 30 minutes.

10. A method of permanently pleating or creasing fabrics comprising fibers of a copolymer of at least 80 percent acrylonitrile and up to 20 percent of a copolymerizable mon-olefinic comonomer, comprising creasing the fabric in a conventional manner, placing said creased fabric around a roll, encasing said roll in a plastic film having a water vapor permeability of from about 0.01 to about 1.5 grams/24 hours/M²/mm. thickness/cm. Hg at 25° C., said film being a polymer selected from the group consisting of polyamides, polyethylene, polypropylene, polyesters, polystyrene, vinyl nitrile rubber and silicone rubber, and subjecting the encased roll to steam at a temperature of from 93° C. to 150° C. for a time of from 5 to 30 minutes in a conventional heating apparatus, allowing the apparatus to cool to room temperature, removing the encased roll, wiping off condensed moisture on said roll and removing said creased fabric from said plastic film.

11. The method of claim 10 in which the fibers are composed of a copolymer of 94 percent acrylonitrile and 6 percent vinyl acetate.

12. The method of claim 10 in which the fibers are composed of a blend of 88 percent of a copolymer, of 94 percent acrylonitrile, and 6 percent vinyl acetate, and 12 percent of another copolymer, of 50 percent acrylonitrile and 50 percent methyl vinyl pyridine.

13. The method of claim 11 in which the plastic film is polyethylene and the temperature is about 95° C. for a period of time of about 20 minutes.

14. The method of claim 11 wherein the plastic film is silicone rubber.

15. The method of claim 11 wherein the plastic film is polystyrene.

16. The method of claim 11 wherein the plastic film is composed of polyamide.

References Cited in the file of this patent

UNITED STATES PATENTS

| | | |
|---|---|---|
| 1,758,234 | Mijer | May 13, 1930 |
| 2,174,215 | Rose | Sept. 26, 1939 |
| 2,357,392 | Francis | Sept. 5, 1944 |
| 2,854,698 | Youngs | Oct. 7, 1958 |
| 2,985,501 | Gagarine | May 23, 1961 |